Oct. 28, 1952　　W. C. GRIFFING ET AL　　2,615,599
MACHINE FOR FINISHING HATS

Filed April 14, 1949　　　　　　　　　　　　5 Sheets-Sheet 1

Inventors
William C. Griffing
By Alfred E. Hodshon
Wooster Davis　Attorneys

Oct. 28, 1952 W. C. GRIFFING ET AL 2,615,599
MACHINE FOR FINISHING HATS
Filed April 14, 1949 5 Sheets-Sheet 3

Inventors
William C. Griffing
Alfred E. Hodshon
By Wooster & Davis Attorneys

Oct. 28, 1952     W. C. GRIFFING ET AL     2,615,599
MACHINE FOR FINISHING HATS

Filed April 14, 1949     5 Sheets-Sheet 4

Inventors
William C. Griffing and
Alfred E. Hodgson
Wooster & Davis Attorneys

Patented Oct. 28, 1952

2,615,599

UNITED STATES PATENT OFFICE 2,615,599

MACHINE FOR FINISHING HATS

William C. Griffing, Danbury, Conn., and Alfred E. Hodshon, Lahaska, Pa., assignors to W. C. Griffing, Incorporated, Danbury, Conn., a corporation of Connecticut Application April 14, 1949, Serial No. 87,379

14 Claims. (Cl. 223—20)

This invention relates to a method and machine for finishing hats, and has for an object to provide a method and machine which will give a better finish to the hat with less wear and tear.

Another object is to provide a machine for finishing hats which is an improvement over the ordinary pouncing methods, and which will remove the hairs on the surface and lay down the fine fur smoothly and evenly without rubbing dirt and particles removed from the hat into the material of the hat, and which will give a more uniform finish color to the hat.

A further object is to provide a machine for finishing hat brims with welted edges, which brims heretofore have required finishing by hand.

A still further object is to provide a machine in which rough pouncing and finishing pouncing can be done in one operation, thus saving from 25% to 50% of the rough pouncing cost and doing a more even job and wasting less material.

Another object is to provide a machine by which because of its delicate operation, surface work on hats can be done which cannot be done on the ordinary pouncing machines.

With the foregoing and other objects in view, we have devised the construction illustrated in the accompanying drawings forming a part of this specification. It is, however, to be understood the invention is not limited to the specific details of construction and arrangement shown, but may embody various changes and modifications within the scope of the invention.

Figure 1:
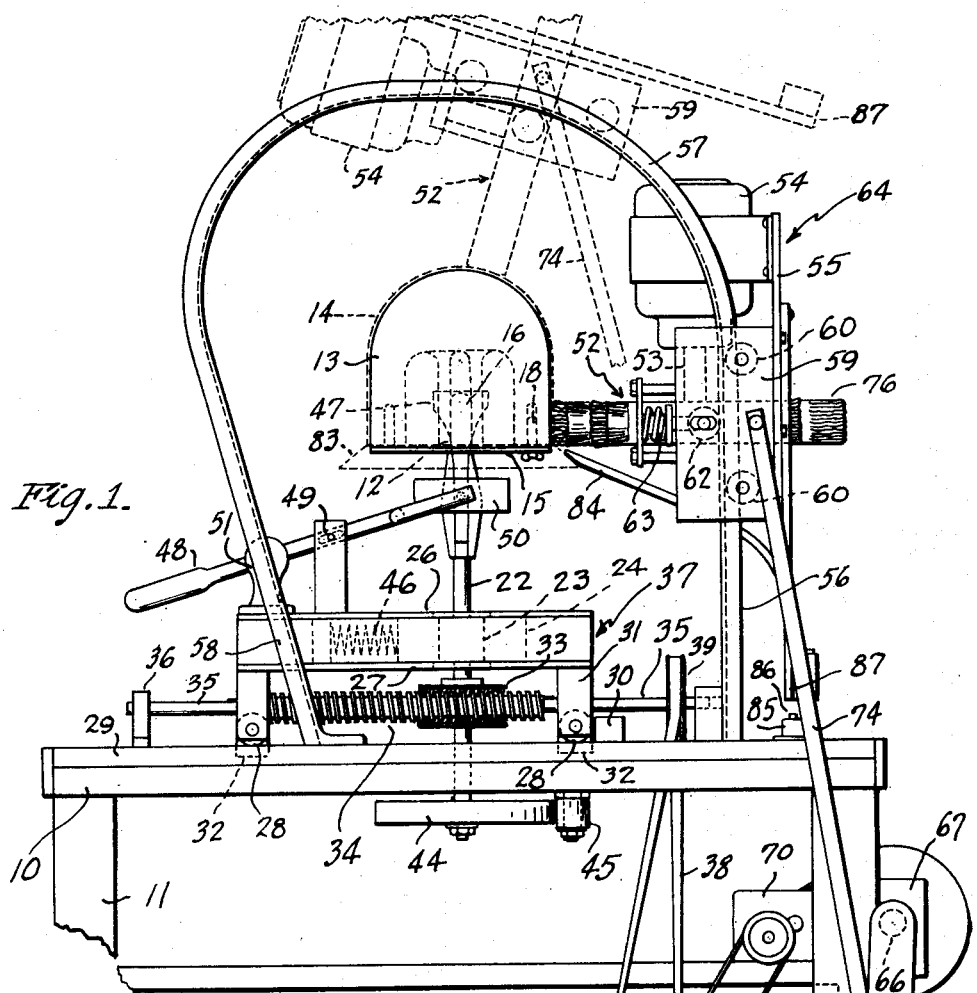
Fig. 1 is a side elevation of the machine.

In the ordinary pouncing of hats, the hat is placed on a wooden block which is oval shaped and rounded to fit the crown of the hat. The crown of the hat is drawn tightly over this block so that it fits closely the surface of the block, and then it is clamped in a holder and slowly rotated while a pad covered with fine sandpaper is run over the surface of the hat with a circular motion. This fine sandpaper takes out the hairs on the surface which have been mixed with the fur, and lays down the fine fur smoothly and evenly on the surface of the hat and in a direction counterclockwise, to finish the hat. This sandpaper, however, as it finishes and smooths the surface of the hat, as well as removing long hairs, rubs or works part of the dirt or pieces which are removed from the hat and the particles of sand that come off the sandpaper, into the surface and fur of the hat, which is difficult to remove and changes the color of the hat.

The present invention performs this pouncing and finishing operation without working or rubbing the dirt into the surface of the hat or the hat fur, and thus gives it a better and smoother finish and also maintains the proper color of the hat. It also has a number of other advantages and improvements over the old methods and machines. It comprises rotating a hat on the block and at the same time rotating at one side of it at a fairly high speed a wheel from the periphery of which extend radially tufts of thin flexible abrasive elements. These may be thin narrow pieces of sandpaper or emery cloth, or could be strips of these materials slit longitudinally from the free end, producing a series of long, narrow flexible strips side by side, which when rotated against the hat surface have a combined light beating or whipping and abrasive or polishing action on the surface fur of the hat.

The embodiment of the machine shown in Figs. 1 to 9 comprises a bed or frame 10 supported on suitable supporting legs 11, and carries a chuck or support 12 for the wooden hat supporting block 13 with means for rotating this block and the hat on it, indicated by the dotted lines 14, at the proper speed. This support for the block includes a plate 15 provided with means for properly positioning the block on the supporting chuck in relation to the finishing means, comprising a central stud 16 to seat in the central opening 17 in the bottom of the block and a laterally spaced pin 18 to enter an opening 19 in the bottom of the block spaced from the opening 17 to locate the block and the hat in the proper angular position, and this pin may be mounted on a radially adjustable block 20 secured in adjusted positions by a clamping nut 21, so that it can be adjusted for different blocks.

The means for rotating the block and hat comprises an upright shaft 22 mounted in a suitable bearing 23 mounted in a slidable block 24, slidable forwardly and rearwardly between suitable guides 25 mounted between the upper and lower plates 26 and 27 forming a carrier 37 for the shaft and block. This carrier is mounted on suitable rollers 28 running on the side rails 29 of the frame so that the carrier and the block may be shifted forwardly for placing a block and hat to be finished on the chuck support or removing the finished hat. After placing a new block and hat on the support it may be shifted back to the finishing position, this movement being limited by a stop block 30 engaged by the rear supports 31, the guide plates 32 engaging one side of the rails 29 to keep the carrier on the rails. Shaft 22 is driven at a relatively low speed by a worm gear 33 meshing with a worm 34 splined on a horizontal shaft 35 below the body of the carrier and supported in suitable bearings 36. The screw 34 is splined on the shaft 35 so that, although driven by the shaft, it will slide longitudinally on the shaft to move with the carrier 37. Or the worm could be made long enough to permit this movement of the worm gear. The shaft 35 is driven by any suitable means, such as a belt 38 running over a pulley 39 on the shaft and a drive pulley 40 on the shaft 41 of the motor 42 mounted on the frame by any suitable means, such, for example, as the cross beams 43 carried by the rear legs 11 of the machine. On the lower part of the shaft 22 is an oval cam 44 of an oval shape corresponding to the shape of the hat block 13 and running at its peripheral edge on a stationary roller 45. The cam is held against this roller by a spring 46 pressing against the block 24 carrying the shaft bearing and thus tends to shift this bearing and the block rearwardly or to the right as viewed in Fig. 1, but will permit the block 24 and with it the shaft 22 and the block 13 to be shifted forwardly under action of the cam 34 as the block rotates, to maintain the surface of the hat at the proper and a uniform distance from the finishing wheel or element 52 during the finishing operation. The gripping or holding fingers 47 of the block-holding chuck may be operated by a forked hand lever 48 pivoted on the carrier at 49 and having its forked end pivoted to a sliding block 50 for operating the gripping fingers to clamp and release the hat block. The details of this chuck are not shown as it is an old and commonly used form of chuck. A suitable hand grip or handle 51 is provided on the carrier 37 for shifting it between the loading and finishing positions.

The finishing element comprises a rotary finishing wheel 52. This is mounted on a shaft 53 of an electric motor 54 mounted on the plate 55 of a frame extending when in the retracted position vertically between the side guide rails 56 mounted on and extending upwardly and forwardly over the bed of the machine. These rails may be of any suitable cross section, but are preferably channel-shaped as this has high strength and rigidity with respect to its cross-sectional area and the material used, and as shown in Fig. 1, these guide rails are curved upwardly and over the hat block, although spaced laterally from it, as shown at 57, the curvature corresponding substantially to the curved surface of the block and therefore the surface of the crown of a hat on the block. At their forward ends they are extended downwardly into the bed of the machine, as indicated at 58, to form a support for the front ends of these rails. The motor plate 55 is supported at its opposite ends on suitable carriages 59, one on each rail 56. They are mounted by any suitable means, preferably by three or four rollers, a pair of these rollers 60 being spaced longitudinally and running in the groove 61 between the side flanges of the rails 56, and an intermediate roller 62 running on the opposite side of the rail, and this roller is yieldably mounted so as to move laterally to compensate for curvature in the rails and is pressed against the rails by a suitable spring 63.

During the hat finishing operation the finishing element 52 and the carriage 64 comprising the plate 55 and the bearing blocks 59 are moved upwardly, forwardly and then backwardly along the rails 56 by any suitable operating means. That shown comprises a pair of cranks 65 secured on the opposite ends of a shaft 66 running in suitable bearings 67 and operated by a belt 68 running over a pulley 69 on the shaft, and from another pulley driven by a speed reducing mechanism 70 which is in turn driven by a belt 71 running over a pulley 72 forming a part of this reducing drive and a pulley 73 on the motor shaft 41. Each crank 65 is connected by a connecting rod or link 74 with the carrier blocks 59, one to each block, so that as the shaft 66 is slowly rotated by the speed reducing drive the crank 65 and connecting link 74 will slide the carriage 64 slowly upwardly and forwardly along the rails 56, as indicated by dotted lines Fig. 1, and back again to the full line position for the hat finishing operation. It will be understood other means may be used for shifting the finishing wheel 52 and its carriage, such as a hydraulic means, for example.

Figures 2, 3:
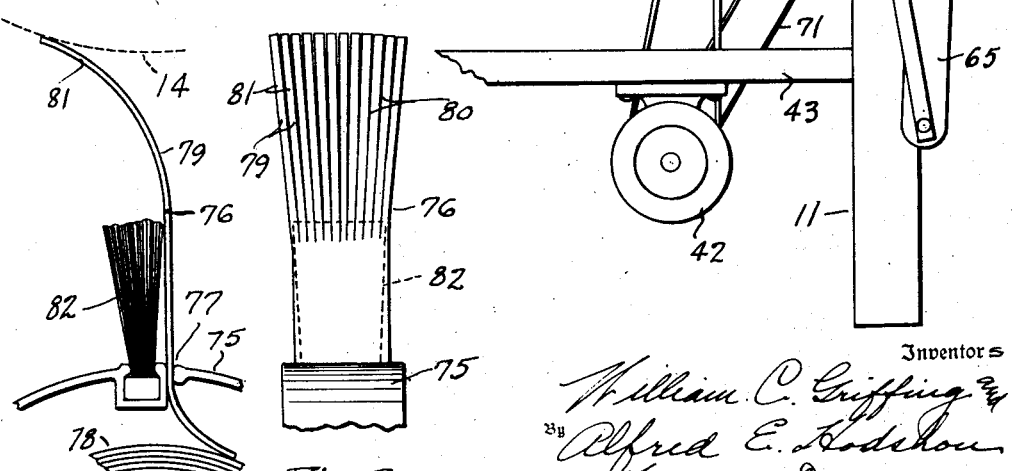
Fig. 2 is a detail side edge view of one of the finishing elements.
Fig. 3 is a view looking from the right of Fig. 2.
Figure 4:
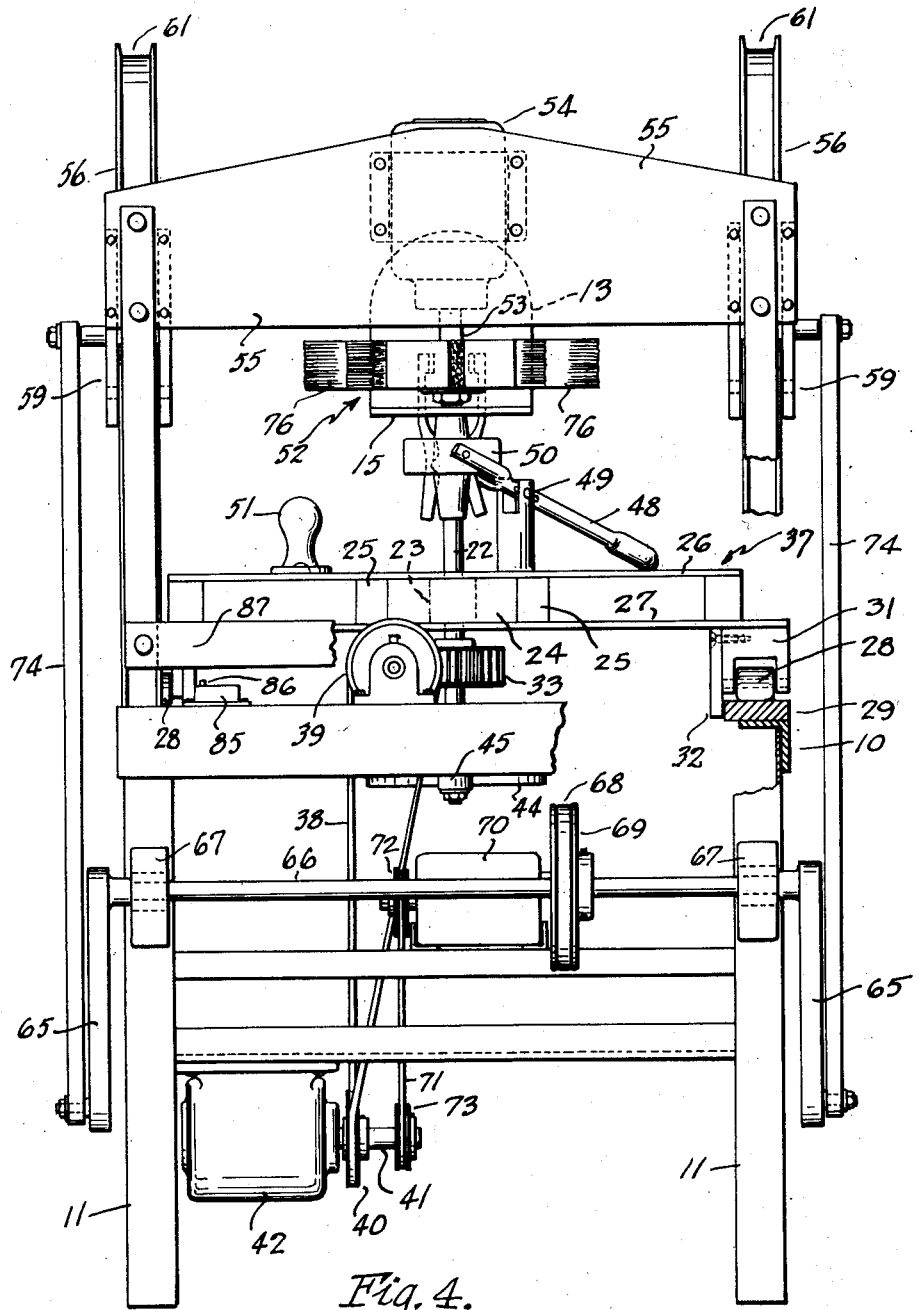
Fig. 4 is a rear view of the machine with parts broken away to more clearly show the construction.
Figure 5:
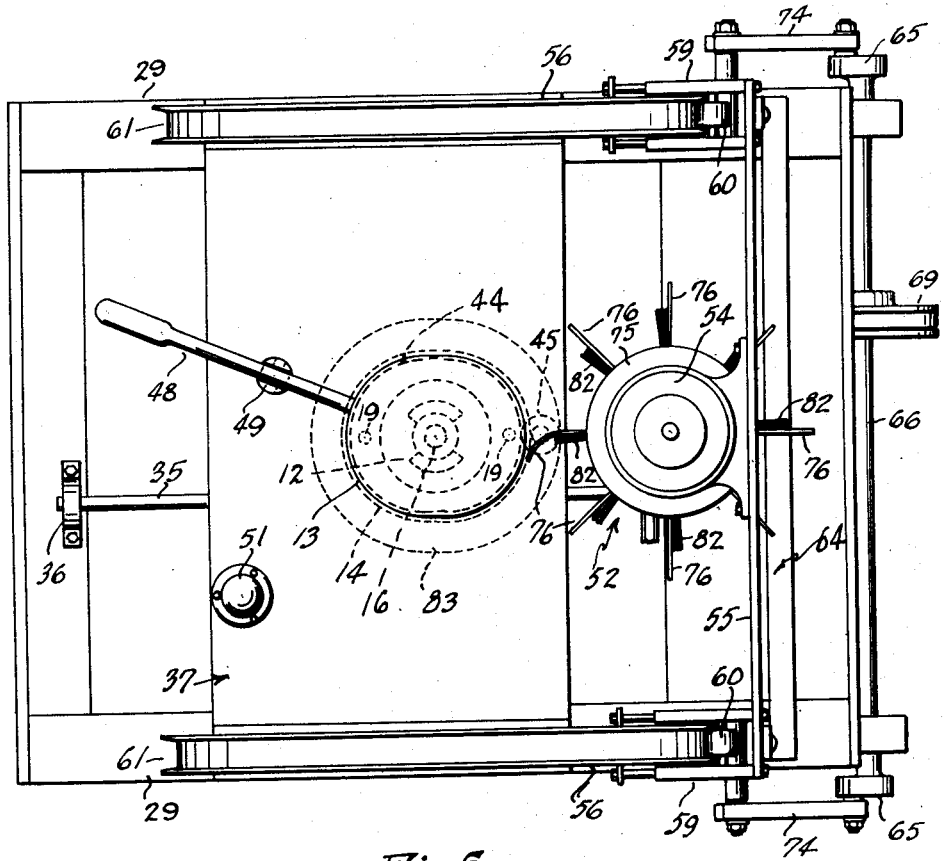
Fig. 5 is a top plan view.
Figures 6, 7:
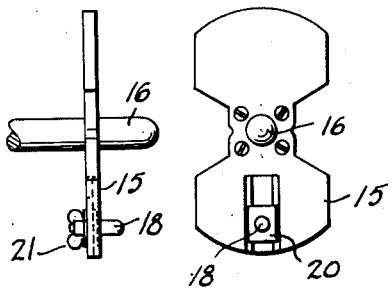
Figs. 6 and 7 are a side and plan view respectively of the mounting plate on the hat block holder.
Figures 8, 9:
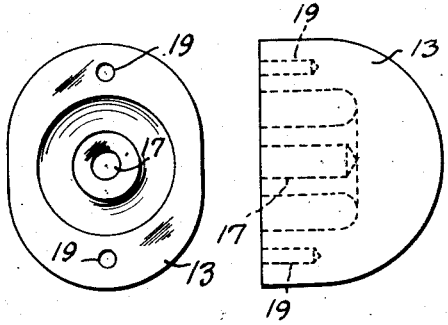
Figs. 8 and 9 are a bottom and side view respectively of a form of hat block which may be used.

The finishing element 52 comprises a hub or housing structure 75 mounted on the motor shaft 53, and projecting radially from the sides of this hub or housing are a series of flexible abrasive elements 76. These may be mounted in any suitable way in the housing 75, but as shown in Figs. 2 and 3, are preferably flat strips projecting outwardly through slots 77 in the periphery of the housing from a suitable coil 78 within the housing. These elements 76 are preferably flat strips of thin flexible material with an abrasive surface 79, and may be strips of fine sandpaper, emery cloth or the like, or even thin flexible strips of plastic covered with fine abrasive material. They may or may not be longitudinally slit, as indicated at 80, to provide separate thin narrow strips 81, depending on the material of the hat and finish desired. It is, however, preferred to slit the strips 76, as indicated in Fig. 3, to produce a series of long narrow flexible strips 81 with abrasive material on one face. These strips are supported or backed up by a tuft of bristles 82 mounted in the rim of the housing 75, and the amount of support for the strips of abrasive element 76 depends upon the length and rigidity of the bristles 82, which may be varied depending on the support desired and depending on the finish desired. As an example, the hub 75 may be about 5½ inches in diameter with the flexible abrasive pieces 76 extending radially outwardly in six or eight tufts, as shown in Fig. 5, and it is rotated at a fairly high speed of about 1750 R. P. M., while the hat is rotated slowly by the block 13, and the carriage 64 is shifted slowly up and back during the finishing operation to carry the finishing element 52 slowly and uniformly over the surface of the crown of the hat from about the level of the hat band or top of the brim to the tip of the crown and back again. During this movement of the finishing element 52, the block 13 and the hat on it are slowly rotated and the hat is shifted forwardly and back by the oval cam 44 running on roller 45, and spring 46 to maintain the portion of the surface of the hat being operated upon by the finishing element at a uniform distance from this element. This will uniformly finish the entire surface of the crown. The mounting of wheel 52 on its support or the position of the hat carrier 36 can be adjusted relative to each other so that the wheel can be spaced the proper distance from the hat for best operation and for different finishes. The speed of rotation of the finishing wheel 52 may be varied depending on the finish wanted, materials used, and so forth. For best results it is fast enough to clean by throwing out the dust.

To prevent the brim of the hat, indicated at 83, from coming against the finishing element, a finger 84 is mounted on the carrier 64 in position to lie above this brim so that as the device comes back to the full line position this finger will engage the top of the brim as indicated in Fig. 1, and keep it from getting into the finishing element.

The motor 42 may be controlled by an automatic switch, such as a microswitch 85 mounted on the frame 10 with its operating plunger 86 in position to be engaged by a bar 87 carried by plate 55 to automatically stop the motor 42 when the finishing element 52 and the parts carrying it reach the full line position of Fig. 1 after the hat finishing operation is completed.

Figures 10, 13:
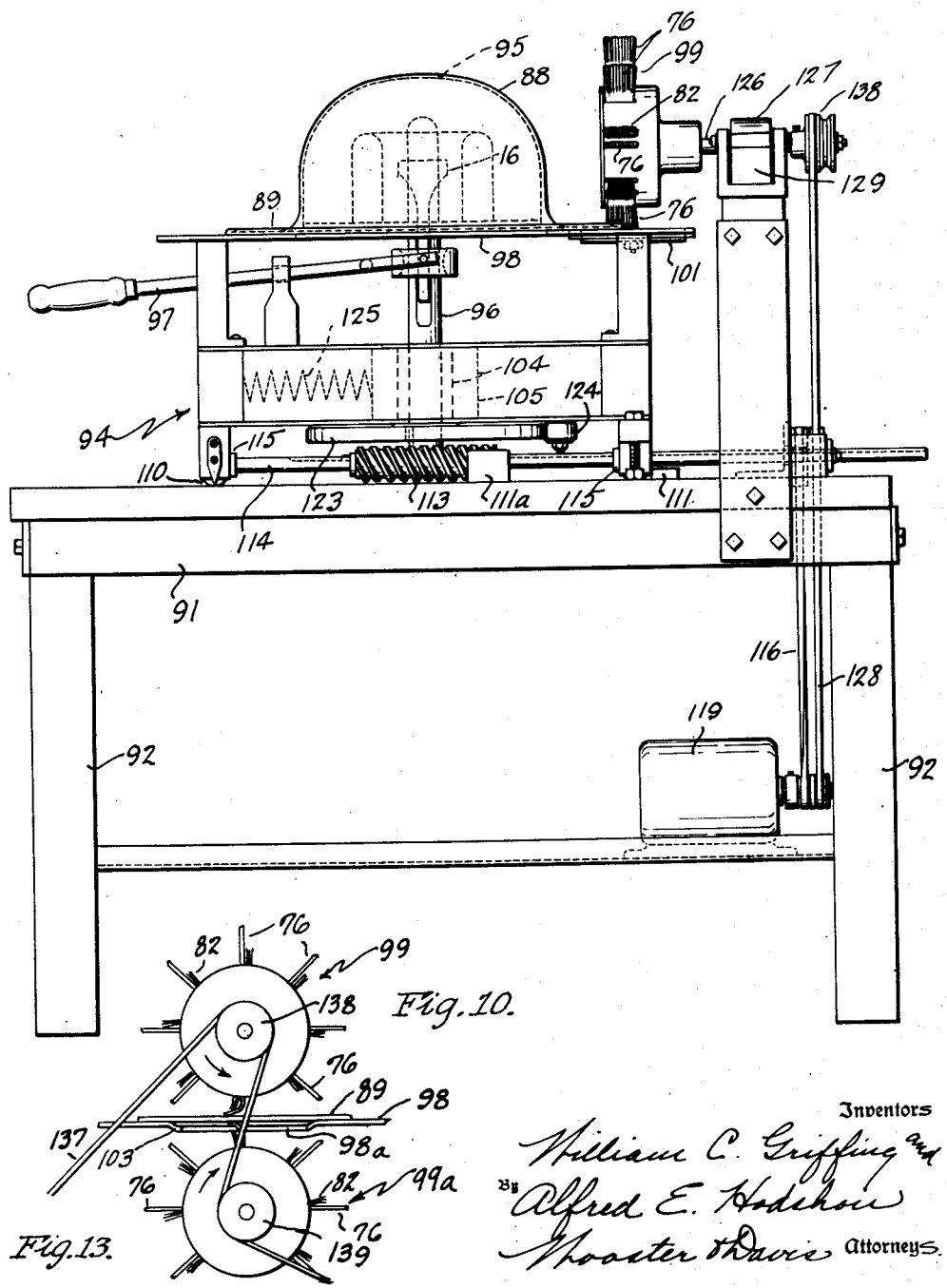
Fig. 10 is a side view of a modified construction showing how the device may be used for finishing welted edge hat brims.
Fig. 13 is a somewhat diagrammatic view showing a modified arrangement of the machine of Figs. 10 and 11.
Figures 11, 12:
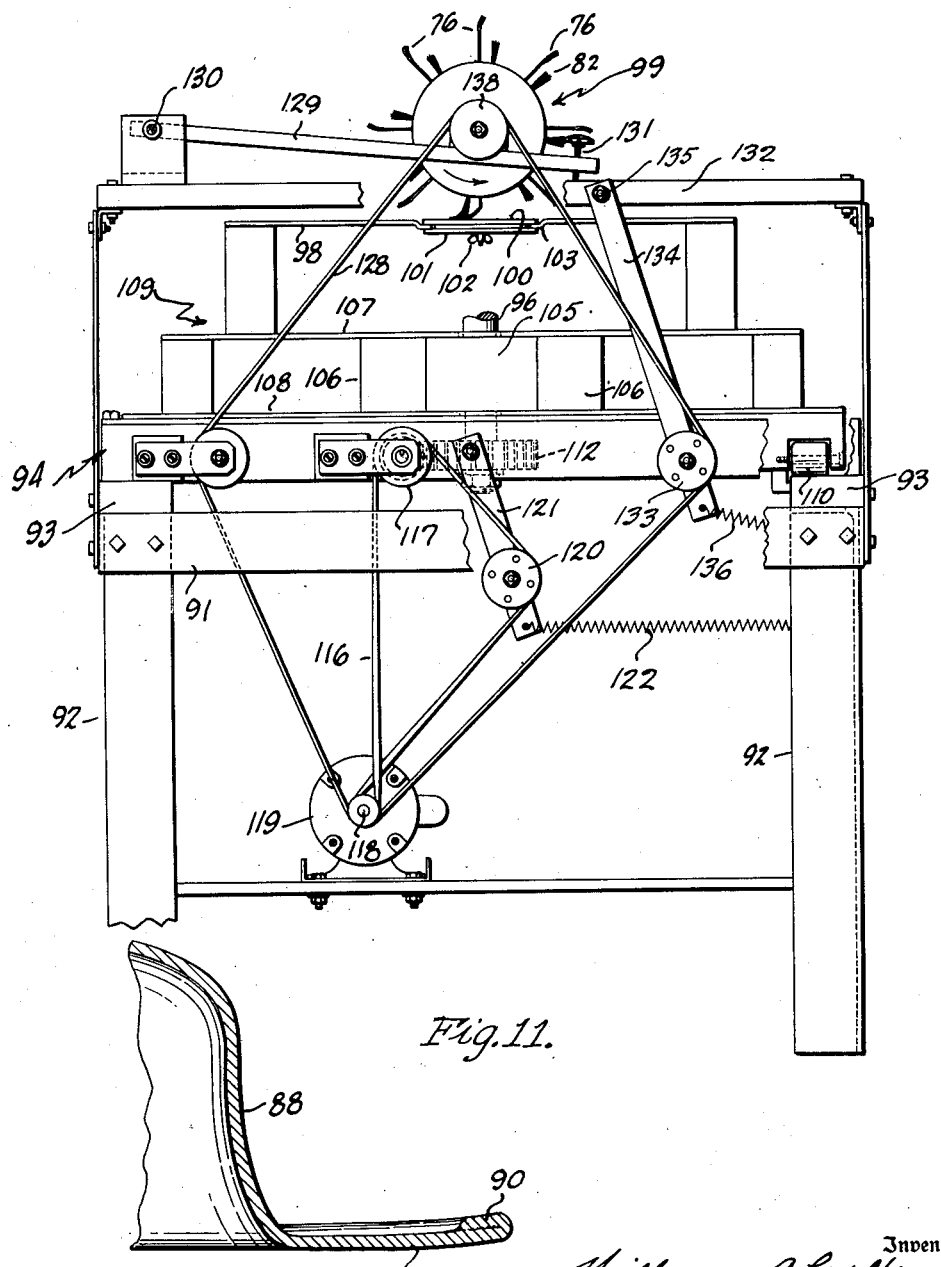
Fig. 11 is a rear view of the machine of Fig. 10.
Fig. 12 is a section of a hat crown and a brim with a welted edge.

In Figs. 10 to 13, the device is shown as modified for finishing the brim of a hat, and with this type of finishing or pouncing wheel this machine may be used for finishing either the usual type of brims, or, equally as well, special types of brims, such as the welted brim which up until the present has required finishing by hand. This hand finishing of this type of brim is a slow, tedious and expensive operation. A portion of such a hat and brim is shown in Fig. 12 in which the crown is indicated at 88, with a brim 89 folded over at the edge 90 to form what is essentially a double thickness at the edge of the brim, the two thicknesses being worked together so that the brim is really a uniform and integral structure. Heretofore this type of brim has required hand pouncing and finishing which was a very slow and expensive operation, but with this device, due to the use of the narrow flexible abrasive strips on the buffing or pouncing wheel, these brims can be finished quickly and uniformly as well as the ordinary types of brim. The machine of Figs. 10 and 11 is essentially the same as that of Figs. 1 to 9, except that in finishing the brim it is not necessary to shift the finishing wheel upwardly and back over a curved path as is done in finishing the crown of the hat. Also the brim is supported. Thus this machine comprises the bed or frame 91 mounted on suitable supporting legs 92, and mounted on this frame are the side rails 93 on which is mounted the carrier 94 for the wooden hat supporting block 95 with means for rotating this block and the hat on it. This block is supported by a suitable chuck the same as described in the first form of the machine on an upright shaft 96, opening and closing of the chuck for clamping and releasing the block being controlled by the hand lever 97 as described in connection with the first form. The block is mounted and located on this chuck by the same means as described in connection with the first form. In this case, however, the hat supporting means also includes a means for supporting the brim comprising the plate 98. This plate has a notch or open portion 98a under the finishing wheel 99 which may be filled by means of a removable plate section 100. When this plate section is in position it makes a continuous top and support with the main body of the plate 98, but may be removed when it is desired to finish both the upper and lower sides of the brim at the same time, as will be presently described. Any suitable means may be provided for removably securing the removable section 100 in place, that shown comprising a clamping plate 101 held by means of a clamping screw 102 whereby the depressed opposite side edges 103 of the recess or opening 98a in the plate 98 may be clamped between the edges of the plate 100 and the clamping plate 101, as shown in Fig. 11.

The means for rotating the hat block 95 comprises the upright shaft 96 in a suitable bearing 104 in a slidable block 105, this block, the same as in the first form, being slidable forwardly and rearwardly between suitable guides 106 mounted between the upper and lower plates 107 and 108 forming a carrier 109 for the shaft and block. This carrier is mounted on suitable rollers 110 running on the side rails 93 of the frame so that the carrier and the block may be shifted forwardly for placing a block and hat to be finished on the supporting chuck or removing the finished hat. After placing a new block and hat on the support or chuck it may be shifted back to the finishing position, as indicated in Fig. 10, this being determined by a stop block 111 engaged by a rear support of the carriage, the same as in the first form. Forward movement may be limited by a similar stop 111a. The shaft 96 is driven at a relatively low speed by a worm gear 112 meshing with a worm 113 splined on a horizontal shaft 114 below the body of the carrier and supported in suitable bearings 115. The screw 113 is splined on the shaft so that, although driven by the shaft, it will slide longitudinally on this shaft to move with the carrier 94; or the worm could be long enough to permit this movement of the worm gear. The shaft 114 is driven by any suitable means such, for example, as a belt 116 running over a pulley 117 on the shaft and a pulley on the rotor shaft 118 of an electric motor 119, and an idler pulley 120 on a pivoted arm 121 may be used to keep the belt taut by means of a spring 122. On the lower part of the shaft 96 is a cam 123 of an oval shape corresponding to the shape of the hat block 95 and brim of the hat, and running on a stationary roller 124 on the lower plate 108 of the carriage. The cam is held against this roller by a spring 125 pressing against the block 105 carrying the shaft bearing and thus tends to shift this bearing and the block rearwardly or to the right as viewed in Fig. 10, but will permit the block 24 and with it shaft 96 and the block 95, together with the hat and brim, to be shifted forwardly under action of the cam 123 as the block rotates to maintain the surface of the brim of the hat at the proper position under the finishing wheel or element 99 for the finishing operation. The plate 98 is provided with a suitable opening to permit this movement of the shaft 96. It will be seen that during this operation the brim of the hat is supported by the plate 98 and the removable section 100 if only the top of a hat brim is being finished. The finishing element comprises a rotary finishing wheel 99, and is the same as that shown at 52 in Figs. 1 to 5, and is the same construction as described in connection with these figures. It is mounted on a shaft 126 running in suitable bearings 127 on the frame and operated through pulley 138 by means of a belt 128 from the motor 119. This finishing wheel is mounted so that it may be adjusted up and down with respect to the brim supporting plate 98 and therefore the hat brim. In this specific construction it is mounted on an arm 129 pivoted to the frame at 130 and adjustable by means of adjusting screw 131 bearing against the transverse member 132 on the frame. The tension of the belt 128 may be kept proper by means of an idler 133 on an arm 134 pivoted to the frame at 135 and tending to be shifted outwardly by a spring 136.

The operation of this device is the same as that described in connection with the first form of the device shown in Figs. 1 to 5, except that in this case the finishing wheel 99 is not carried bodily over the hat as described in the first form, but is stationary except for its rotary movement. Also, in this case the hat brim is supported as it passes under this wheel in the finishing operation. As above stated, these narrow flexible strips 81 with their abrasive surfaces can be used to finish hat brims with thickened outer edge portions, such as welted edge brims shown at 90 in Fig. 12, and will finish such brims with a uniform finish and with a uniform color, the same as described in connection with finishing of the surface of the hat crown in the description of the first form of the device. It will properly finish such a brim without requiring any hand pouncing or finishing operation such as is required with the present known devices. Because of the flexibility of these narrow abrasive strips they will yield to properly and uniformly finish the top surface of the welted thickened edge 90 as well as the lower surface of the brim inwardly of this thickened edge.

In Fig. 13 is shown somewhat diagrammatically how this device may be used for finishing both the upper and under surfaces of the hat brim simultaneously. Thus in this case the removable plate section 100 is removed and a second finishing wheel or element 99a of the same structure as the element 99 is provided below the brim supporting plate 98 under this recess 98a in the plate. Therefore, as the brim 89 of the hat passes over this recess or opening in the plate, both the upper and under surfaces of the brim are finished by the two finishing wheels 99 and 99a driven in opposite directions from the motor 119 by the belt 137 running over the pulleys 138 and 139. Otherwise the operation is the same as described in connection with the other figures.

It is to be understood the dimensions of the finishing element 76 and the speed of operation as described may vary considerably, depending on conditions, the material being operated upon, and the finish desired. The strips 76 may be about 1½ inch wide and the slits 80 spaced about ⅛" for normal operation, but these may vary considerably, depending upon the material and the finish desired. The length of these flexible members, or that is, the distance they project outwardly from the hub or housing 75, as well as the tuft of bristles 82 backing them up, may be varied to give varying flexibility, depending on the type of hat and also on the finish desired.

By this device these thin flexible abrasive strips give a light beating or whipping action against the surface of the hat and at the same time, because of their flexibility, as they are bent backwardly as shown in Figs. 2 and 5, the abrasive side is also drawn a short distance over the surface of the hat as it moves by, so the method comprises a combination of giving the surface of the hat a light beating or whipping action, together with a light abrasive or polishing action by means of the narrow strips of fine flexible abrasive material, such as sandpaper, cloth, brushes, emery cloth or paper, or even light flexible plastic covered with abrasive. Also as the narrow strips 81 are separate they are free to spread laterally as they rotate or hit the hat surface. They give a light pouncing action as well as light beating or whipping, which cleans out the hair, dust, and so forth from the surface of the hat, leaving a smooth finish which keeps the ends of the fur down, giving a particularly fine, smooth finish to the surface of the hat, and as the dirt and particles are thrown out, instead of being rubbed into the surface of the hat, as in the old pouncing methods, this surface is kept clean, giving a much smoother and better finish, and the natural color is maintained. In other words, in taking out the dust and dirt the natural color is allowed to come up and the smooth finish means that the nap is laid down smooth counterclockwise, with a smooth satiny finish. In the old pouncing method, if there was a high spot on the hat, that is, if there was a spot that was thicker than the rest of the hat, the old pouncing method would cut the outer portions of this off, leaving a spot of a different shade or color than the rest of the hat, and this could not later be removed. With this new method and machine these high spots are merely finished the same as the rest of the hat, so no spot shows on the finished hat. This method and machine is also much easier on the hat, while the old pouncing method was hard on the material and removed or took off considerable of this material. As it works on the surface only, it does not dig into the hat as in the old method, and does not take off anywhere nearly as much material. The pressure can be made variable for different finishes and the finishing can be accomplished with removal of very little of the material. In short, because of its more delicate touch it can do surface work which cannot be done on the ordinary pouncing machine and gives a much nicer and finer finish. It performs the pouncing and finishing operation without working or rubbing the dirt into the surface of the hat or fur, to thus give a smoother and better finish, and also maintain the proper color of the hat. As it cleans the dust off in the finishing operation, it does not need a vacuum or suction to take it off as in common pouncing. With this method and machine no powder need be used in finishing. Also, due to the way this operates, less labor and effort is used in finishing and getting the proper color over the old method. Other pouncing methods require later hand work, that is, hand pouncing at the bench or in between the machine pouncings, but this machine and method eliminate this, or at least much less is required. Further, less greasing is required. With old methods sometimes greasing is required two or three times. With this method and machine, greasing only ounce is sufficient. With this machine the rough pouncing and finishing pouncing can be performed in one operation, thus saving from 25% to 50% of the rough pouncing cost, and also doing a more even or uniform job, and wasting less material.

The cranks 65 act in shifting the finishing element over the surface of the hat with a variable speed. It will be seen from Fig. 1 that when the cranks are at their lowest position and are passing through or are near the vertical plane through the axis of shaft 66, the carrier 64 and finishing element 52 move the slowest and are in their lowest position and the element is operating on the lowest part of the hat crown, or that is, the portion of largest diameter. Also, as the cranks move upwardly shifting the finishing element toward the tip of the crown, the speed of movement over the surface of the hat increases as the element acts on progressively smaller diameters of the crown. This action gives more uniform finishing of the surface of the hat, as the duration of action on the different surfaces of the hat is substantially uniform.

It will be seen from the above that the device is equally adapted for finishing the crown and brim of the hat, and that still further it can be used for finishing special forms of brims, such, for example, as the welted edge brim which heretofore has required hand finishing.

Having thus set forth the nature of our invention, we claim:

1. A hat finishing machine comprising means for supporting and rotating a hat block with the hat on it, a finishing element comprising a rotatable support on the periphery of which are a plurality of peripherally spaced groups of radially extending thin narrow flexible abrasive strips, means for slowly rotating the block and hat, and means for rapidly rotating the finishing element adjacent the surface of the hat so that the free end portions of the strips beat on and are drawn laterally over this surface.

2. A hat finishing machine comprising a shaft, means for mounting a hat supporting block on said shaft, a finishing element comprising a rotatable support on the periphery of which are a plurality of circumferentially spaced groups of radially extending thin narrow flexible abrasive strips projecting from the periphery thereof, means for slowly rotating the block, means for rapidly rotating the support at one side of the block so that the free end portions of said strips will simultaneously lightly beat and be drawn laterally over the surface of the hat, and means for relatively shifting the hat and finishing element so as to successively finish the surface of the hat.

3. A hat finishing machine comprising a shaft, means on the shaft for carrying a hat block for supporting the hat, a finishing element comprising a rotatable support located at one side of the block on the periphery of which support are a plurality of circumferentially spaced groups of radially extending thin, narrow, flexible strips of abrasive material, means for slowly rotating the block, means for rapidly rotating said elements to cause the free end portions of the flexible strips to lightly beat the surface of the hat and also draw them laterally a short distance over this surface, and means to shift the hat block toward and from the finishing element during said action in accordance with the oval shape of the hat to maintain the surface of the hat at a substantially uniform distance from the finishing element.

4. A hat finishing machine comprising a frame, an upright shaft, means on the shaft for mounting a hat block carrying a hat to be finished, a support for the shaft mounted for forward and back movements, a finishing element to the rear of the shaft comprising a rotatable member provided with a series of narrow flexible abrasive strips for finishing the surface of the hat, said member comprising a central support on the periphery of which are a plurality of circumferentially spaced groups of radially extending thin, narrow, flexible strips of abrasive material, a shaft for said element, a carrier for said shaft and element, upright curved guides on the frame extending upwardly and forwardly on opposite sides of the block, means for supporting the carrier on said guides, means for slowly rotating the block, means for rapidly rotating the finishing element so the free end portions of the strips contact the surface of the hat, and means for slowly shifting the carrier upwardly and forwardly on said guides during operation of the block and finishing element to shift the element over the surface of the hat.

5. A hat finishing machine comprising means for supporting and rotating a hat block with the hat on it, a finishing means at one side of said block comprising a hub member, a series of thin narrow flexible flat abrasive strips extending laterally from said hub, said strips being arranged in a plurality of groups located about the periphery of the support with a plurality of the strips in each group arranged side by side, means for slowly rotating the block and hat, and means for more rapidly rotating said hub member to cause the free end portions of said abrasive strips to lightly beat the surface of the hat and be drawn a short distance laterally over said surface.

6. A hat finishing machine comprising means for supporting and rotating a hat block with the hat on it, a finishing means at one side of said block comprising a hub member, a series of flexible flat abrasive strips extending laterally from said hub, said strips comprising narrow strips arranged in spaced groups around the periphery of the hub and provided with abrasive material on one surface, means for slowly rotating the block and hat, and means for more rapidly rotating said hub member to cause the free end portions of said abrasive strips to lightly beat the surface of the hat and at the same time be drawn laterally a short distance over said surface.

7. A hat finishing machine comprising a frame, an upright shaft, means for supporting a hat block and hat on said shaft, a carrier at one side of said shaft, laterally spaced upwardly and forwardly curved guides on said frame, supporting means for the carrier running in said guides, a rotatable finishing means on the carrier comprising a hub and a series of narrow flexible abrasive strips extending radially from the hub, said strips being arranged in a plurality of groups located about the periphery of the support with a plurality of the strips in each group arranged side by side, means for rotating the hub to cause the free end portions of said strips to engage the surface of the hat, a shaft, cranks on said shaft, links connecting said cranks with the carrier supporting means, and means for rotating the latter shaft to shift the carrier along said guides to shift the finishing means relative to the hat on the block.

8. A hat finishing machine comprising means for supporting and rotating a hat block with the hat on it, a finishing means at one side of said block comprising a hub member, a series of flexible flat abrasive strips extending laterally from said hub, said strips comprising narrow strips arranged in spaced groups around the periphery of the hub and extending radially therefrom, said strips being provided with abrasive material on their forward surfaces, a tuft of brush fibres arranged at the rear side of each group of said strips to support them and extending radially from the hub a less distance than the length of said strips, means for slowly rotating the block and hat, and means for more rapidly rotating said hub member to cause the free end portions of said strips to act on the surface of the hat.

9. A hat finishing machine comprising a frame, a carriage mounted on the frame for forward and backward movements, an upright shaft, a supporting block, a bearing for the shaft in said block, guides for the block mounted in the carriage, means for mounting an oval hat block and hat on the shaft, a rotatable hat finishing means to the rear of the hat block mounting means, a spring tending to shift the block and shaft rearwardly in the carriage, an oval cam similar in shape to the hat block mounted on the shaft, a roller against which the cam runs, and means for rotating the shaft to rotate the hat and cam and through action of the cam and spring to shift the hat and block forwardly and backwardly from and toward the hat finishing means as the hat rotates.

10. A hat finishing machine comprising means for supporting a hat brim, a rotatable finishing element comprising a support with a series of narrow flexible abrasive strips extending radially therefrom, said strips being arranged in a plurality of groups located about the periphery of said support with a plurality of these strips in each group, means for slowly rotating the hat and brim, and means for rapidly rotating the finishing element adjacent the surface of the brim so that the free end portions of the strips beat on and are drawn laterally over this surface.

11. A hat finishing machine comprising a shaft, means for mounting a hat supporting block on said shaft, a supporting plate for the brim of a hat on the block, a finishing element comprising a rotatable support provided with a series of narrow flexible abrasive strips projecting from the periphery thereof, said strips being arranged in a plurality of groups located about the periphery of the support with a plurality of the strips in each group arranged side by side, means for slowly rotating the block to rotate the hat and brim, means for rapidly rotating the support adjacent the brim so that the free end portions of said strips will simultaneously lightly beat and be drawn laterally over the surface of the brim, and means for relatively shifting the hat and finishing element to finish the surface of the brim.

12. A hat finishing machine comprising a shaft, means on the shaft for carrying a hat block for supporting the hat, means at one side of the block for supporting the hat brim, a finishing element comprising a rotatable support located at one side of the brim provided with a series of flexible narrow abrasive strips, said strips being arranged in a plurality of groups located about the periphery of said support with a plurality of these strips in each group, means for slowly rotating the block, means for rapidly rotating said element to cause the flexible strips to lightly beat the surface of the brim and also draw them laterally a short distance over this surface, and means for shifting the block toward and from the finishing element during said action in accordance with the oval shape of the hat brim to maintain the surface of the brim at an uniform relation to the finishing element.

13. A hat finishing machine comprising a supporting plate for a hat brim, means for slowly rotating the brim on said plate, a finishing element comprising a rotatable support located at one side of said plate and provided with a series of flexible narrow abrasive strips extending laterally therefrom, said strips being arranged in a plurality of groups located about the periphery of the support with a plurality of the strips in each group arranged side by side, and means for rapidly rotating said element to cause the free end portions of the flexible strips to lightly beat the surface of the brim and also draw them laterally a short distance over this surface.

14. A hat finishing machine comprising a supporting plate for a hat brim and provided with a gap, means for slowly rotating a hat on said plate to pass the brim over said gap, a finishing element located on each side of the plate opposite said gap, each said element comprising a rotatable support provided with a series of flexible narrow abrasive strips extending outwardly therefrom, said strips being arranged in a plurality of groups located about the periphery of said support with a plurality of these strips in each group, and means for rapidly rotating said elements to cause the free end portions of the flexible strips to lightly beat the opposite surfaces of the hat brim and also draw these strips laterally over these surfaces as they pass over said gap in the plate.

WILLIAM C. GRIFFING.
ALFRED E. HODSHON.

REFERENCES CITED

The following references are of record in the file of this patent:

UNITED STATES PATENTS

| Number | Name | Date |
|---|---|---|
| 394,747 | Wolcott | Dec. 18, 1888 |
| 1,599,717 | Reynolds | Sept. 14, 1926 |
| 1,949,565 | Edwards | Mar. 6, 1934 |
| 2,148,153 | Eichenbaum | Feb. 21, 1939 |
| 2,443,413 | Bonkowski | June 15, 1948 |